June 6, 1961 G. MAZZONI 2,986,796
MACHINES FOR THE CONTINUOUS CUTTING OF A BAR OF PLASTIC MATERIAL
Filed Jan. 15, 1959 2 Sheets-Sheet 1

INVENTOR
GIUSEPPE
MAZZONI
BY
ATTORNEY

United States Patent Office 2,986,796
Patented June 6, 1961

2,986,796
MACHINES FOR THE CONTINUOUS CUTTING OF A BAR OF PLASTIC MATERIAL
Giuseppe Mazzoni, Viale Duca d'Aosta 1, Busto Arsizio, Italy
Filed Jan. 15, 1959, Ser. No. 787,060
Claims priority, application Italy Jan. 22, 1958
8 Claims. (Cl. 25—106)

This invention relates to improvements to machines for the cutting of a continuously fed, bar of plastic material, such as yeast, soap, putty, cheese, butter, margarine and substances of substantially similar mechanical properties.

The above stated products are usually extruded as a continuous bar, which is then continuously cut into portions of the same desired length.

The type of machine which is usually employed for the above purpose, consists of a conveyor belt, by which the extruded bar is supported, and of a continuous chain to which cutting blades are attached in suitable spacing relationship. The chain is arranged at a given inclination in respect to the extruded bar whereby, upon engagement of the first cutting blade with the bar, this latter will cause the chain to move, thus causing all other blades to cut into and through the bar, which is thereby cut into pieces having a length according to the spacing of blades.

With this type of machine as heretofore known any change in the length of pieces to be cut requires the blade-supporting chain to be replaced by another chain, with blades spaced so as to cut the required length.

Alternatively—though infrequently—the machine can be fitted with a chain provided with a device that allows the spacing of blades to be individually adjusted. Thus, in one such arrangement, the single chain links are connected to one another by bolts so that adjusting each of such bolts, the distance between cutting blades can be altered.

Now, since the above described operation must be repeated for each chain link, an accurate adjustment of all spacings will require a long time; moreover, due to design of adjusting devices, the variation in length is restricted to a few millimeters.

From the above considerations it can be inferred that any change in the cutting blade spacing on this type of machine is a time consuming operation.

The present invention relates to a special type of cutting blade chain, and to a related adaptation of above described machine, which allows the spacing of cutting blades to be quickly adjusted within wide limits.

In the accompanying drawings a preferred embodiment of the invention is illustrated, but what follows is not to be construed so as to limit the invention to this embodiment.

Figure 1:
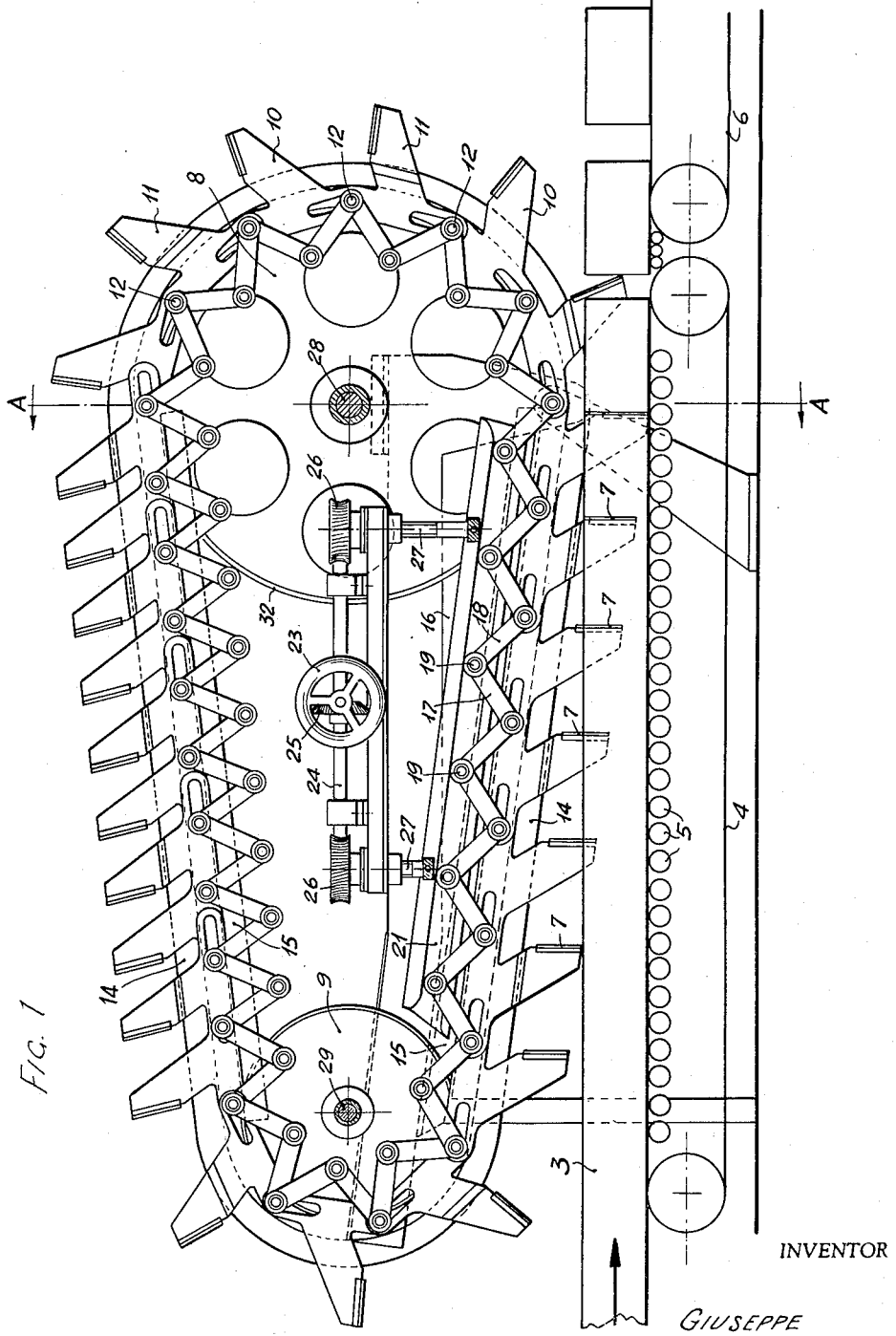
FIGURE 1 is a diagrammatic longitudinal section of machine.

The bar 3 of plastic material coming from the extrusion die in the direction of the arrow, rests on a conveyor band, 4, supported by rollers 5.

The conveyor band 6 is a continuation of conveyor band 4.

The cutting system, consisitng of blades 7, linked in such a manner as to form an endless chain, is fitted over the belt 4, and the bar 3, which last by its own movement imparts a rotational movement to said endless chain.

The bar 3, fed to the machine, is progressively cut into portions by the blades 7, connected by links, thereby forming an endless chain, wound on the two pairs of end wheels 8 and 9. In the drawing, the pair of wheels 9 is shown—only as an example—with a diameter smaller than that of wheel pair 8; however, the diameter of wheels 9 might also be equal to that of wheels 8. Obviously, in both cases, the path covered by the cutting blades 7, while cutting the bar 3, must always be inclined to the bar, so as to allow a progressive cutting. Therefor by equal diameter of the wheels 8 and 9, the axis of wheels 9 must be higher than that of wheels 8 to have the lower blades cover an inclined path with respect to the conveyor band 4 and bar 3.

Figure 2:
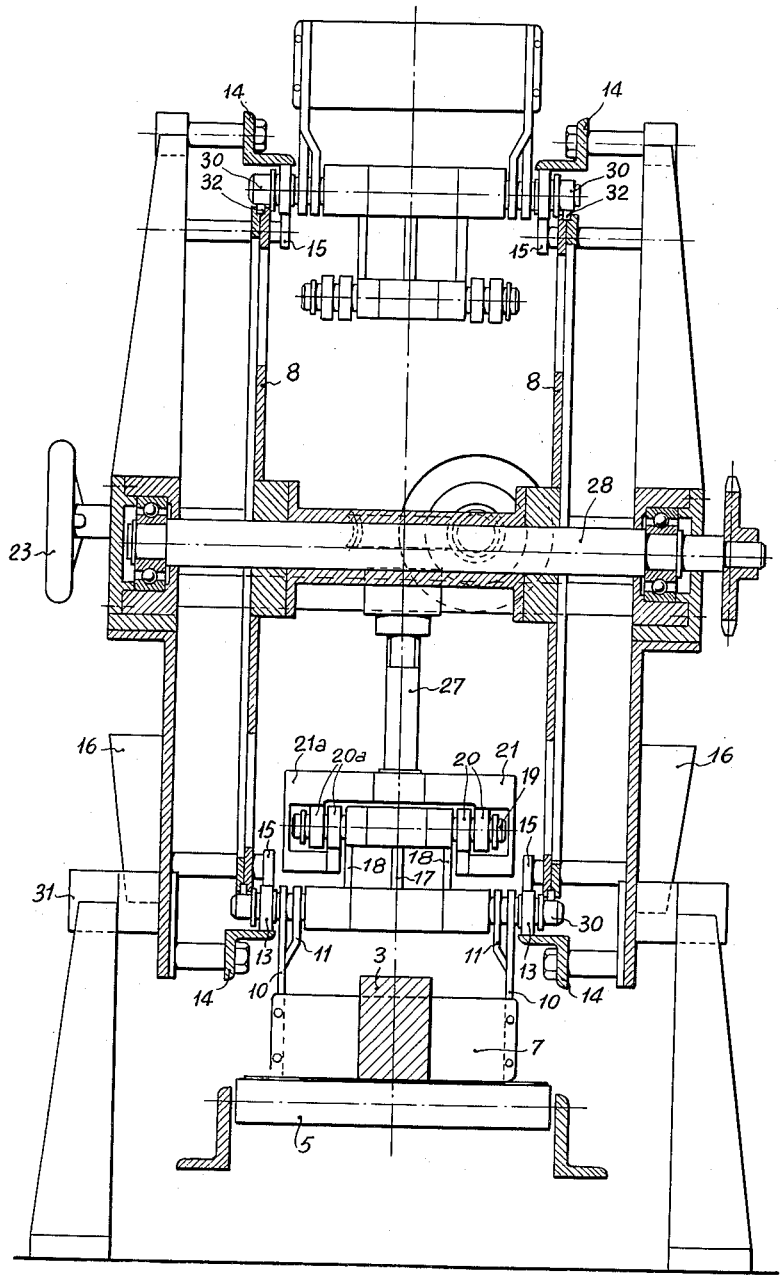
FIGURE 2 is a cross section taken along the line A—A of FIGURE 1.

The chain with the blades 7, consists of a plurality of similar links composed of two members 10 and 11, articulating together on pins 12 (FIG. 2), passing through round holes at the front and through oblong slots to the rear.

The length of said slots determines the possible variation of the spacing between the cutting blades. These pins 12 are also connected by journals to the connecting rods 17 and 18, which themselves are connected together by being journalled to the pins 19. All the joints are thus free to articulate. The ends of the pins 12 are provided with rollers 13 which can be journalled on them by means of ball-bearings. These rollers 13 run between the guides 14, 15, which surround the whole chain limiting its vertical movement. The pins 19, are also provided with similar rollers 20 and 20a which have to pass beneath the guides 21, 21a, attached to the frames of the machine.

Decreasing the distance between the guides 21, 21a and the guide 15, will cause a flattening of the chain with the result that, owing to the rigid nature of the connecting rods, 17 and 18 of the chain, the pins 12, will be moved further apart, and hence also the blades 7. Thus the length of cut of the machine can be increased, or by moving the guides apart, decreased. Once the distance between the guides 21, 21a and 14, 15 is fixed, the spacing between the blades 7 remains absolutely constant. The upper part of the chain between the wheels 8 and 9 will take up any changes in spacing of the lower blades 7 due to the movement apart of the lower pins 13. Since the links are all of the same dimensions, the blades will be a constant distance apart between the guides 21, 21a and 14. A design of gearing, in which by turning the handwheel 23, a vertical adjustment of guides 21 and 21a is obtained, is shown only as an example in the FIGURES 1 and 2, not to limit the scope of the invention. In it the rotary motion imparted to handwheel 23 is transmitted to shaft 24 through the pair of bevel gears 25. Both ends of shaft 24 are integral with two worms, by which two worm-wheels 26 are driven. In the threaded center holes of worm-wheels 26, two threaded rods 27, are engaged, which bring about the vertical movement of guides 21 and 21a parallel to the guides 14.

Thus, by suitable design of this gearing, a convenient ratio of variation of cut length, to number of turns imparted to the handwheel 23 (as indicated on a dial) can be established. Then, for instance, each complete turn of handwheel 23, might result in a variation of 1 mm. in the cut length.

A circular ring 32, made of a resilient material (for instance natural or synthetic rubber, plastics or material capable of serving the same purpose in the invention) is secured to the periphery of each wheel of the pair 8.

The metal rings 30, fitted on the ends of pins 12, of the cutting chain make contact with the outer face of this resilient ring as the wheels are turned.

The distance between the inside surface of curved guide 14, and the outside face of resilient ring 32, is such as to press the metal rings 30, on to the resilient ring 32, whereby rotary motion transmitted from a suitable geared motor (not shown in the drawing) to the pair of wheels 8, will impart a forward motion to the cutting chain, thus relieving the bar 3, of most of the force which must be exerted by it to move the chain and blades.

The pair of wheels 9, might also be fitted with similar rings of special rubber.

The pair of wheels 9, might also be driven, as that of wheel 8, by means of a belt, or chain or shaft transmission, through which the shaft 29, of wheel pair 9, is connected with the shaft 28, of wheel pair 8.

The drive to the wheels, 8 or 9, or both is obtained by means of a mechanical, hydraulic or magnetic sliding clutch, cooperating with bar 3 for imparting to the cutting chain a rotational movement. The friction of the clutch is so regulated as to allow its component parts to run at differential speeds and therefor to compensate any variation of speed of the bar being cut. It is also possible to automatically control the speed of the cutting chain in accordance with the speed of the bar 3 by means of electric or mechanical or hydraulic device.

The foregoing description of the machine in question is not inclusive of those devices which are already known, and fitted on similar machines, as for instance the device designed to alter the inclination of cutting line in respect to bar 3, by turning the sides, 16, around the axis, 31, and the device designed to raise, to lower and to incline the conveyor band, 4. Also, within the scope of the invention, the guides can so be made as to enclose the chain, including the chain where it passes round the wheels, 8 and 9.

What I claim is:

1. In a machine for cutting of a continuously fed plastic material into uniform sizes comprising a cutting device having a plurality of cutting elements, first means connected to said elements to form them into an endless chain, second means spaced from said first means to determine relative distance between said cutting elements, linking means connecting said first means with said second means, means for rotating said endless chain and cutting elements to effectively cut said plastic material, and guide means for said first and second means to regulate the distance between said cutting elements.

2. A machine according to claim 1 in which said elements contain cylindrical and oblong holes for variable movement therebetween while said elements are moving.

3. A machine according to claim 1 in which said first and second means comprise pins.

4. A machine according to claim 1 in which said linking means consist of connecting rods with one end of each mounted on said first means and the other end of each mounted on said second means.

5. A machine according to claim 1 in which said means to rotate said endless chain comprises two pairs of wheels having resilient material on their periphery imparting motion to said first means, one pair of wheels in relation to the other pair of wheels moving said cutting elements into effective cutting position.

6. A machine according to claim 1 in which said guide means comprises a stationary guiding member for said first means and an adjustable guiding member for said second means.

7. In a machine for cutting of a continuously fed plastic material into uniform sizes comprising a cutting device having a plurality of cutting elements, cylindrical and oblong holes arranged in said elements, first pins having rollers thereon contained within said holes, second pins having rollers thereon spaced from said first pins, connecting rods having one end mounted on said first pins and the other end mounted on said second pins to connect said cutting elements into an endless chain, two pairs of wheels having resilient material on their periphery rotating said endless chain, stationary guide means in which the rollers of said first pins move, and adjustable guide means in which the rollers of said second pins move whereby the distance between said elements while the device is cutting can be regulated.

8. In a machine according to claim 7 in which said second pins and said first pins are disposed in two irregular and parallel endless paths, the distance between the two paths varying in relation to the position of the cutting elements as they are rotated, and one of said pair of wheels in relation to the other said pair of wheels moving said cutting elements into effective cutting position.

References Cited in the file of this patent

UNITED STATES PATENTS

| | | |
|---|---|---|
| 297,671 | Chambers | Apr. 29, 1884 |
| 1,024,122 | Dawkins et al. | Apr. 23, 1912 |
| 1,828,793 | Van Buren | Oct. 27, 1931 |